United States Patent

Urban

[15] 3,675,818

[45] July 11, 1972

[54] SEED PLANTER WITH REPLACEABLE ROTARY TRAP CHAMBER

[72] Inventor: Era E. Urban, Rural Routh No. 1, Bluffton, Ohio 45817

[22] Filed: Sept. 14, 1970

[21] Appl. No.: 71,690

[52] U.S. Cl..............................221/224, 221/235, 222/370
[51] Int. Cl..........................................................B65h 3/28
[58] Field of Search...........................221/224, 233, 234, 235; 222/220, 342, 345, 349, 370, 177, 178

[56] References Cited

UNITED STATES PATENTS

| | | | |
|---|---|---|---|
| 2,510,658 | 6/1950 | Rassmann | 221/224 X |
| 897,220 | 8/1908 | Michael | 221/235 |

Primary Examiner—Stanley H. Tollberg
Assistant Examiner—Larry Martin
Attorney—Larson, Taylor and Hinds

[57] ABSTRACT

The present invention relates to a seed planter for planting a row of seeds. The device includes a rotating annular ring member provided with a plurality of seed receiving apertures in the periphery thereof. A second annular ring member is located concentrically within the first-mentioned annular ring member and forms a floor for each seed cell for retaining seeds therein. The rotating ring member moves relative to a seed hopper wherein seeds are introduced into the seed cells. Continued rotation of the seed cell member brings the seeds into adjacency with the ground at which point they are ejected from the seed cells. The rotating speed of the seed cell member is adjustable relative to the linear speed of the seed planter thus providing an infinitely variable seed spacing in the ground. The seed cell size is determined by the size of the seed receiving aperture of the annular rotating ring member. This member is readily disconnectable from the seed planter to vary the aperture size. Thus, if it is desired to utilize the seed planter for larger seeds having the same thickness, it is merely necessary to quickly disconnect the annular seed cell ring and replace this with a similar ring having larger apertures. If it is desired to change the depth of the seed cells to accomodate seeds having different thickness, in one embodiment of the invention the second, inner, annular ring member is also disconnected from the seed planter. The inner ring member is replaced with one which is thinner in cross section and the seed cell ring member is replaced with a ring which is thicker in cross section, the apertures of which are thus deeper. In an alternative embodiment, a deeper seed cell is provided without removing the inner ring member by providing the outer ring member with a peripheral slot wider than the widest seed cell desired. A semicircular member is positionable into the peripheral slot and thus the thickness of the seed cell is determined by the depth of the slot. In this embodiment, it is only necessary to replace the outer ring member to vary the seed cell aperture width or depth or both.

9 Claims, 10 Drawing Figures

INVENTOR
ERA E. URBAN

BY Larson, Taylor and Hinds
ATTORNEYS

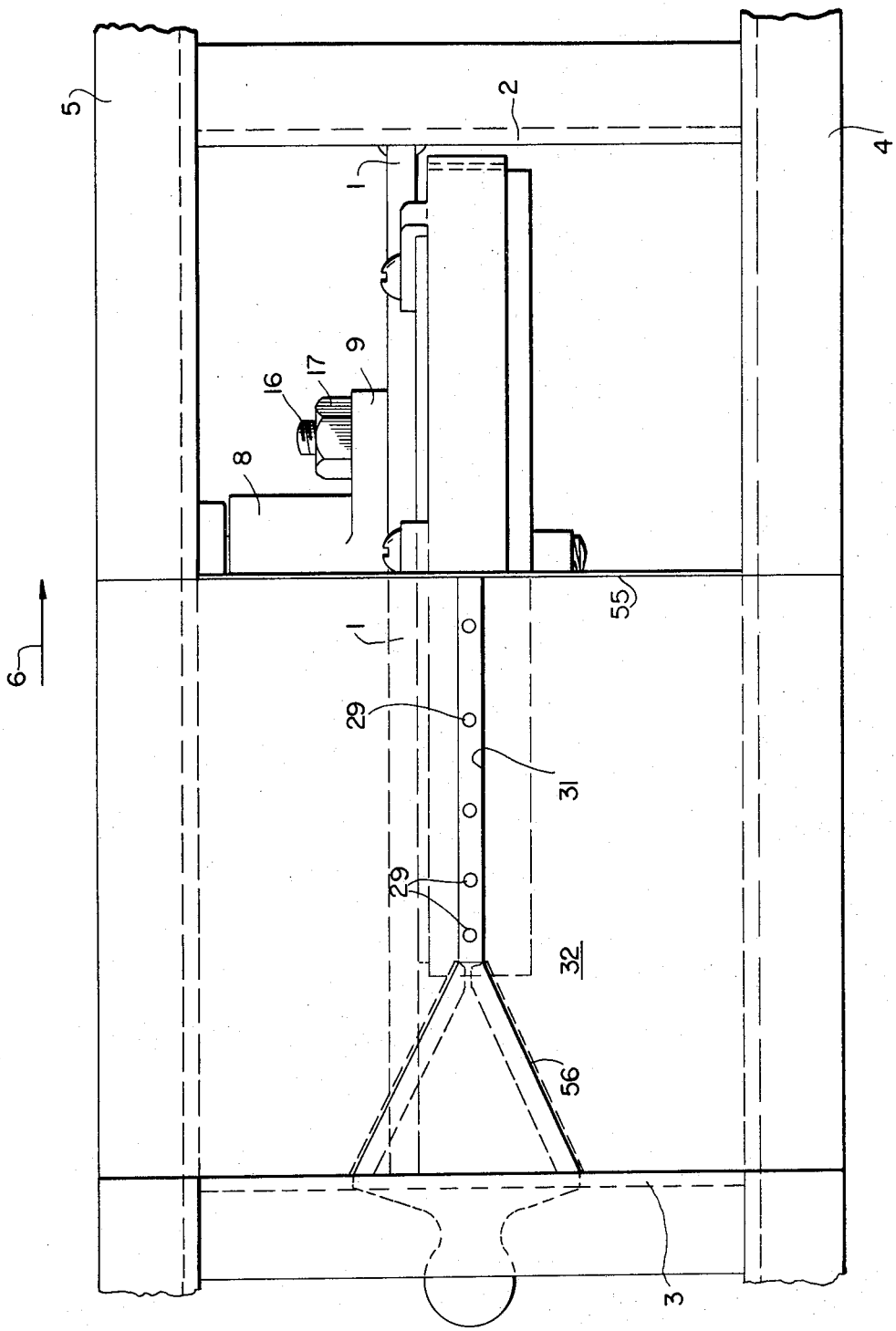

INVENTOR
ERA E. URBAN
ATTORNEYS

SEED PLANTER WITH REPLACEABLE ROTARY TRAP CHAMBER

BACKGROUND OF THE INVENTION

The present invention relates to seed planters. More particularly, the invention relates to seed planters for planting seeds in a row. Still more particularly, the invention relates to a seed planter which is easily modified to accommodate seeds of different sizes.

There are many types of devices for planting rows of seeds. Among the known seed planters are devices which provide for adjustment of seed spacing. Other seed planters permit accommodation of seeds of differing types. However, accommodation of seeds of various types is usually accomplished by rather complex and expensive mechanisms. Moreover, in such devices it is frequently difficult to vary seed spacing.

It is an object of the present invention to provide a seed planter which is easily modified to accomdate the seeds of varying sizes. It is a further object to provide such a seed planter which is simple and inexpensive and yet robust in construction. It is a further object to provide such a seed planter which provides for variations in seed spacing. It is yet a further object to provide such a seed planter where the seed spacing is infinitely variable.

BRIEF SUMMARY OF THE INVENTION

The foregoing and other objects which will be apparent to those having ordinary skill in the art are achieved according to the present invention by providing apparatus for planting seeds in a row comprising supporting frame means; a drive shaft rotatably mounted on said frame and having its longitudinal axis positioned transverse to a row of seeds being planted; a first circular member releasably secured to said drive shaft for rotation therewith and comprising a first annular ring member having a cylindrical outer surface concentric with said drive shaft and a cylindrical inner surface concentric with said drive shaft; a second circular member fixed with respect to said frame and comprising a second annular ring member having a cylindrical outer surface concentric with said drive shaft and closely adjacent to the cylindrical inner surface of said first annular ring member, said second annular ring member being provided with an opening in said cylindrical surface at the lower portion thereof; said first annular ring member being provided with a plurality of seed-holding apertures spaced around the periphery thereof, the opening of said apertures and the thickness of said first annular ring member conforming substantially to the size of the individual seeds to be planted; seed hopper means including an opening adjacent an upper portion of the circular path of travel defined by the outer cylindrical surface of said first circular ring member for introducing seeds from said hopper means into said apertures; seed ejecting means located at a lower portion of the circular path of travel defined by the outer cylindrical surface of said first circular ring member and comprising a member moveable through said opening at the lower portion of said second annular ring member for ejecting seeds radially outwards from said apertures to plant a row of said seeds; and aperture closure means comprising a curved member positioned concentrically with respect to the cylindrical outer surface of said first ring member and located between said seed hopper means and said seed ejecting means for preventing dislodgement of seeds from said apertures.

DETAILED DESCRIPTION OF THE INVENTION

There follows a detailed description of a preferred embodiment of the invention, together with accompanying drawings. However, it is to be understood that the detailed description and accompanying drawings are provided solely for the purpose of illustrating a preferred embodiment and that the invention is capable of numerous modifications and variations apparent to those skilled in the art without departing from the spirit and scope of the invention.

FIG. 3 is a top view of the device of FIG. 1;

FIG. 4 is a sectional view along the lines IV, IV of FIG. 1;

FIG. 5 is a view of a portion of the device taken along the lines V, V of FIG. 2;

Figure 7A:
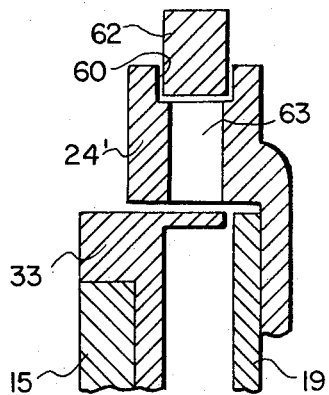
Figure 7B:
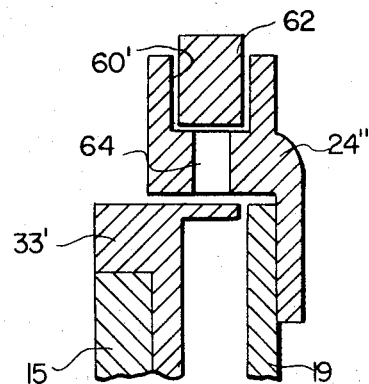
Figure 7C:
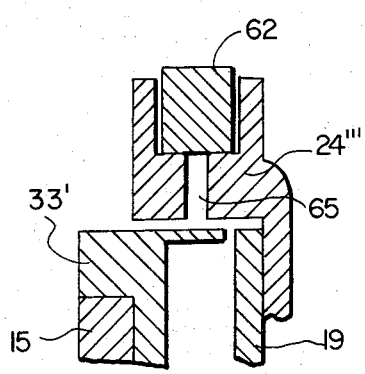
Figure 8:
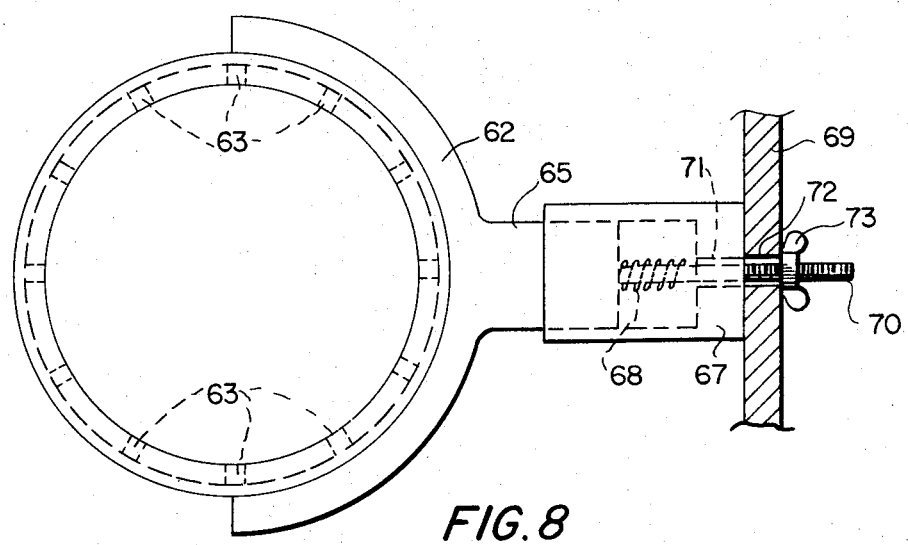

FIGS. 7A, 7B, and 7C are diagrammatic cross sectional views of a portion of an alternative device according to the invention; and FIG. 8 is a diagrammatic side elevation, partially in section, of the embodiment of FIG. 7A.

With reference to the drawings, a seed planter according to the present invention comprises a frame member 1 extending longitudinally of the seed planting device between transverse frame members 2 and 3 to which it is welded. Frame members 2 and 3 are, in turn, welded to longitudinal frame members 4 and 5 which constitute a supporting frame for the seed planter according to the present invention. The frame is provided with conventional means for attachment to a tractor for pulling in the direction of arrow 6 for planting seeds.

Frame member 1 is provided with an aperture 7 for receiving a drive shaft housing 8. The drive shaft housing 8 includes shoulders 9, 10 defining a mounting flange adjacent frame member 1. The drive shaft housing includes a drive shaft bushing 11 accommodating drive shaft 12 which is rotatable by means of a belt (not shown) driving pulley 13 which is secured to drive shaft 12 by means of a set screw 14.

A circular plate 15 is secured to frame member 1 by means of bolts 16 extending through plate 15 and shoulders 9, 10 of bearing housing 8. Circular plate 15 and bearing housing 8 are fixedly secured to frame member 1 by means of nuts 17 provided on bolts 16. Bolts 16 are conveniently welded or otherwise secured to circular plate 15 such as by a conventional bolt head or additional nut, not shown. Circular plate 15 includes a central aperture 18 accommodating drive shaft housing 8. Drive shaft 12 is thus mounted for rotation transverse to longitudinal frame member 1 and having its longitudinal axis positioned transverse to the direction of motion of the seed planter indicated by arrow 6. Thus, the drive shaft is positioned with its lontiduainal axis transverse to a row of seeds being planted.

A second circular plate 19 is mounted for rotation with drive shaft 12. Drive shaft 12 includes a milled square portion 20 which accommodates a square aperture in the central portion of circular plate 19. Milled portion 20 provides a flange against which circular plate 19 bears. The outer portion 21 of drive shaft 12 is threaded to accommodate nut 22 for tightening plate 19 against the shoulder through washer 23. Thus, plate 19 is secured to drive shaft 12 for rotation therewith.

Figure 1:
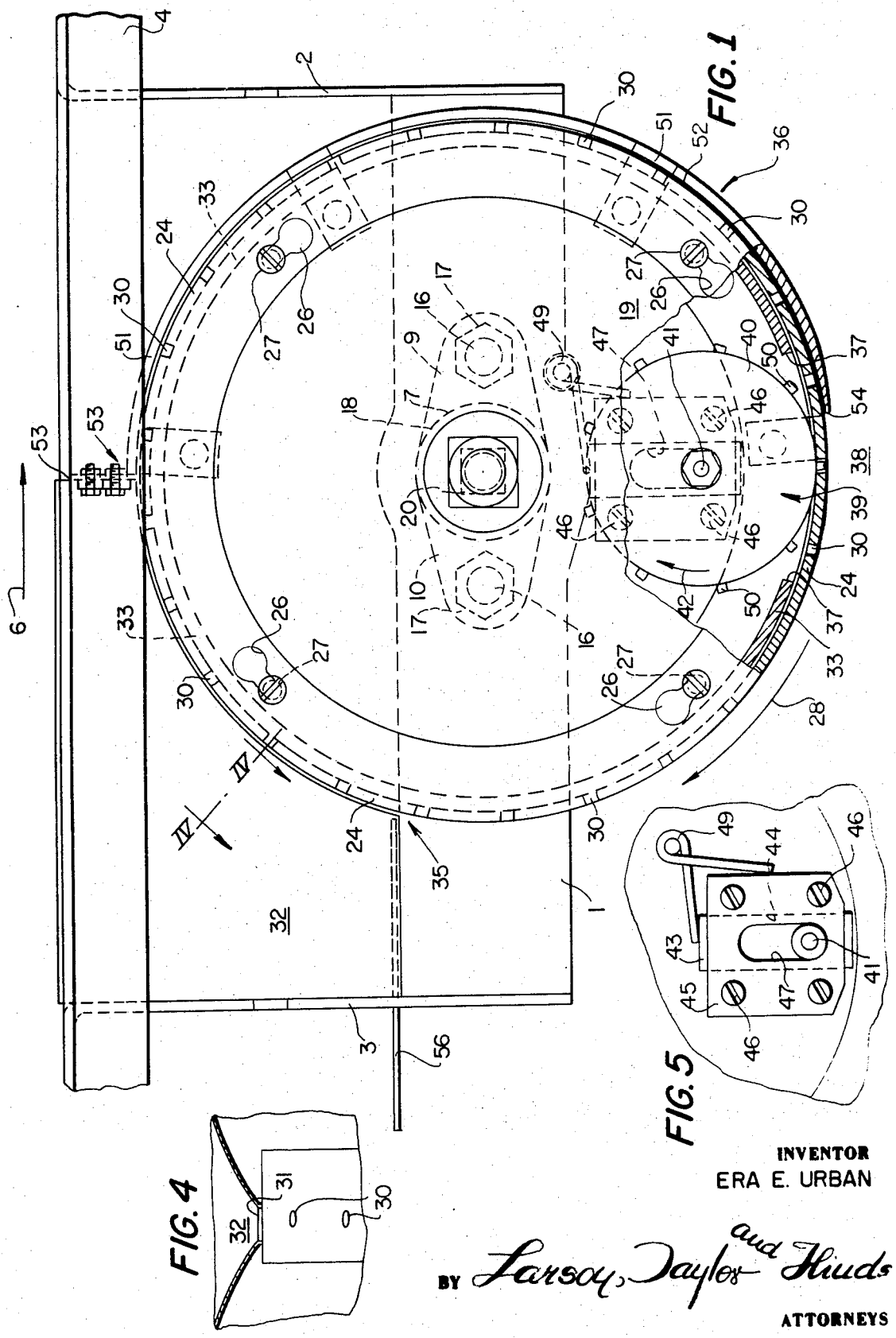
FIG. 1 is a side elevation, partially in section and partially broken away, of a seed planting apparatus according to the present invention.
Figures 2, 6:
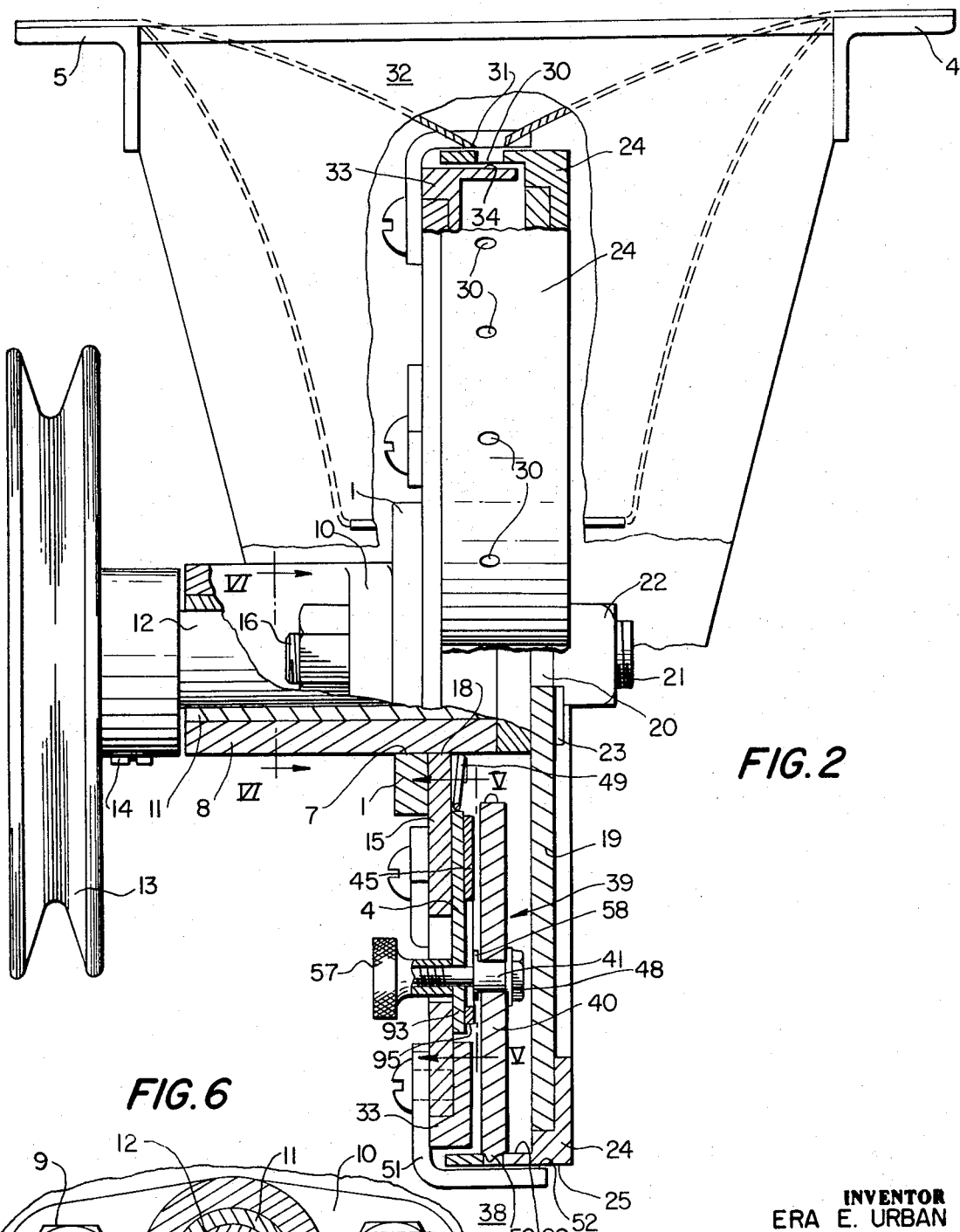
FIG. 2 is a left side view of the device of FIG. 1 also partially in section and partially broken away.
FIG. 6 is a sectional view taken along the lines VI, VI of FIG. 1.

A first annular ring member 24 having a cylindrical outer surface 25 concentric with drive shaft 12 is releasably secured to circular plate 19 by means of keyhole slots 26 and screws 27 shown most clearly in FIG. 1. These are oriented as shown in FIG. 1 to prevent accidental dislodgement from plate 19 upon rotation thereof in the direction of arrow 28. Annular ring member 24 also includes an inner cylindrical surface 29. Ring member 24 is provided with a plurality of seed receiving apertures 30 each of which extends from outer cylindrical surface 25 to inner cylindrical surface 29 of ring member 24. Each of these apertures defines a seed receiving cell. Rotation of drive shaft 12 in the direction of arrow 28 moves ring member 24 in a cylindrical path relative to drive shaft 12. Motion of the ring member 24 in this path brings outer cylindrical surface 25 into adjacency with an opening 31 in seed box 32. Seed box 32 includes a plurality of graded seeds having a substantially uniform size. For example, the seed box might contain large soybeans. Opening 31 in the seed hopper is sufficient to permit passage of any seed to be planted into adjacency with apertures 30 in annular ring member 24. A ring member 24 is selected having an appropriate size opening for admission of these large soybean seeds. The plate also has sufficient thickness to accommodate the height of the seeds in apertures 30. Thus, each seed is accommodated in an aperture of ring member 24 which ring member is selected in dependence upon the size of the seeds to be planted. In order to change plates of any given thickness, it is merely necessary to quickly disconnect plate 24 and replace it with an alternative plate 24 having a different size aperture opening. The device according to the present invention also includes means to vary the depth of the seed cells in plate 24.

A second annular ring member 33 having a cylindrical outer surface 34 concentric with the drive shaft and closely adjacent to the cylindrical inner surface 29 of ring member 24 is releasably secured to circular plate 15 carried by frame member 1. Annular ring member 33 is preferably releasably secured to circular plate 15 by keyholes and screws (not shown) similarly as ring member 24 is secured to circular plate 19. Annular ring member 33 cooperates with annular ring member 24 to provide a floor for each seed cell 30 for the retention of a seed therein. Accordingly, it is only required that the annular ring member 33 be provided along the circular path of travel of apertures 30 where a floor is required for the retention of seeds. In the device illustrated, it is thus only necessary that the inner annular ring member 33 extend from a point 35 adjacent the bottom of the seed hopper to a point generally indicated as 36 wherein the gravitational forces generally cause the seed to move away from the bottom of the seed cell. In the embodiment shown, the annular member 33 extends around circular plate 15 and includes an opening 37 in cylindrical surface 34 at the lower portion of ring member 33.

The outer cylindrical surface 34 of ring member 33 thus provides a floor for apertures 30 in annular ring member 24. When it is desired to plant seeds requiring a deeper aperture, ring member 33 is removed from circular plate 15 and replaced by a new plate 33 the outer cylindrical surface 34 of which is in proper position with respect to the inner surface 29 of a new outer annular ring member 24. Where both annular ring members are changed, circular plate 19 is removed from drive shaft 12 by loosening nut 22. This permits easy removal of inner annular ring member 33 from plate 15. Plate 24 is removable from plate 19 in the manner indicated above either prior to or subsequent to removal of circular plate 19 from drive shaft 12.

It will be seen from the foregoing that for the accommodation of a seed which is simply larger in size but not thicker, it is merely necessary to replace outer annular ring member 24. Where it is desired to accommodate a seed which is both larger and thicker, it is required only to remove a single nut 22 and to then replace plates 33 and 24 to accommodate the larger seeds. It will thus be seen that the present device affords a simple and inexpensive structure for planting any seed irrespective of its size. Seed size varies quite widely. For example, field corn seed is usually classified as large flat, medium flat, small flat, large round, medium round and small round. The round seed is substantially thicker than the flat seed and the large seed is substantially larger than the small seed. Soybean seeds, on the other hand, are generally round but vary substantially in diameter. Large soybeans are approximately one-fourth inch in diameter whereas medium soybean seeds are approximately three-sixteenths of an inch in diameter. Sugar beet seeds, on the other hand, are much smaller. A large sugar beet seed is only slightly larger than one-eighth inch in diameter. It will be apparent to those having ordinary skill in the art that by the selection of suitable annular ring members 24 and 33, any such seeds can be planted in a seed planter according to the present invention. It is merely necessary to change these plates as desired to accommodate these seeds and it will be apparent that the changing of plates is easily accomplished with a device according to the present invention.

The seeds introduced into apertures 30 from hopper 32 are conveyed in a circular path in the direction of arrow 28 until the seeds are conveyed to the lower portion 38 of the seed planter.

A seed ejection device 39 is located at the lower portion of the seed planter for ejecting seeds from apertures 30. The seed ejector includes a member 40 rotatably mounted on shaft 41 for rotation in the direction of arrow 42. Shaft 21 is journaled for rotation in plate 43 which is moveable vertically in a channel 44 provided in plate 45 rigidly secured to circular plate 15 by means of bolts 46. A slot 47 is provided in member 15 to accommodate vertical motion of shaft 41. Member 40 is mounted for rotation on shaft 41 by means of a nut 48. Plate 43 is urged downwardly by means of a spring 49. Shaft 41 and attached rotatable member 40 are thus urged downwardly into engagement with the inner cylindrical surface 29 of outer annular ring member 24. Rotatable member 40 includes a plurality of arms 50 extending radially outwards and spaced to be insertable into successive apertures 30. Thus, member 40 is rotated in a direction of arrow 42 upon rotation of annular ring member 24 in the direction of arrow 28. Arms 50 thus are inserted into each successive aperture to eject a seed therefrom when the seed is located at lower portion 38 of the seed planting device.

In order to prevent seeds from being dislodged from the outer cylindrical surface 25 of annular ring member 24, the device includes a curved ring member 51 extending approximately half way around the periphery of the cylindrical seed planter and including a cylindrical surface 52 located in concentric adjacency with the outer cylindrical surface 25 of annular ring member 24 thus closing the outer portion of each aperture 30. In the embodiment shown, the curved ring member 51 extends from a point 53 adjacent the seed hopper to a point 54 adjacent the lower portion of the device and terminating just prior to the point at which an arm 50 is fully inserted into an aperture 30 for the ejection of a seed therefrom.

The forward end of the seed hopper 32 includes a wall 55 extending downwardly into adjacency with the outer cylindrical surface 25 of annular ring member 24. The bottom of hopper 32 is provided with a slidably removable door for emptying the hopper when required.

A seed planter according to the invention is secured to a tractor or other conventional pulling device in a suitable manner for motion in the direction of arrow 6. Annular ring member 25 is rotated by any convenient means such as pulley 13 in the direction of arrow 28; Seeds are thus conveyed from hopper 32 and planted, the spacing of the seeds being determined by the spacing of apertures in plate 24 and the speed or rotation of plate 24 relative to the linear speed of the planting device along the ground. The drive shaft 12 is conveniently driven at an infinitely variable speed by means of any conventional drive means such as a positive instant variable drive of the type normally used on combines and threshers. By providing a variable rotational speed for member 24, it will be seen that it is possible to achieve virtually any desired seed spacing. Moreover, this is accomplished in a device which readily accommodates any size seed by simply replacing annular ring member 24 either alone or together with annular ring member 33. Where the device includes a seed ejector such as member 40 shown in the drawings, removal of ring member 24 is facilitated by moving ejector 40 radially inwards. This is easily accomplished by moving knob 57 radially inwards thus lifting arms 50 out of engagement with apertures 30 in ring member 24. Member 40 is conveniently held in this remote position by tightening knob 57 on shaft 41 to tightly engage flange 58 and knob 57 with plate 45. Plate 43 is thus held in channel 44 against the action of spring 49.

Opening 31 of seed box 32 is an elongate channel conforming to the cylindrical shape of outer surface 25 of annular ring member 24 and the bottom of the walls forming the channel are closely spaced from surface 25 to prevent inadvertent loss of seeds. Thus, the outside diameter of each annular ring 24 is the same irrespective of the depth of the seed cells therein.

Deep cells are provided by utilizing a thick ring 24 and an inner ring with an outer cylindrical surface of correspondingly reduced diameter.

The shape of the apertures can vary widely. In plan, each aperture is conveniently round. The walls preferably flare outwardly in a radially outward direction and the inner edge is preferably rounded to facilitate seed ejection.

In an alternative embodiment, it is not required to remove inner ring member 33 to change the depth of the seed cells. Accordingly, in this embodiment, change in seed cell width or depth can be accommodated by simply changing outer ring member 24.

With reference to FIGS. 7 and 8, outer ring member 24' is provided with a peripheral slot 60 wider than the widest seed cell aperture desired. This is illustrated in FIG. 7A which shows slot 60 wider than seed cell aperture 63 which is the largest desired. Slot 60 thus forms a peripheral chamber adjacent the outer openings of seed cells 63. A member 62, to be described in detail below, is mounted on the device and is positionable into slot 60 adjacent the bottom of slot 60 as shown. The seed cell depth is thus established by the depth of slot 60, larger cells being established when slot 60 is shallow. The diameters of the inner and outer surfaces of each ring member 24' is the same such that these surfaces will cooperate with ring member 33' and the opening 31 of the seed hopper 32. Seed cell depth is varied by selecting ring members 24' having varying depths of slot 60. Thus, a thick seed is accommodated in seed cell 63 of ring member 24', an intermediate seed is accommodated in seed cell 64 of ring member 24'', and a thin seed is accommodated in seed cell 65 of ring member 24'''. The width of a seed cell is determined by the width of the apertures in ring member 24' as in the embodiment described above and as shown in FIGS. 7A, B and C.

FIG. 8 illustrates the manner in which member 62 is mounted on the device. Member 62 replaces member 51 (See FIG. 1) and, like member 51, is approximately semicircular, extending between plate 55 and member 39. Member 62 includes integral projection 65 moveable in slot 66 in member 67. Member 62 is biased to the left in the sense of FIG. 8 towards the bottom of slot 60 by compression spring 68 acting between the bottom of slot 66 and projection 65. Member 67 is secured to frame member 69 which may be conveniently secured to frame member 2. A threaded rod 70 integral with projection 65 extends to the right in the sense of FIG. 8 through aperture 71 in member 67 and aperture 72 in frame member 69. Member 62 is positioned adjacent the bottom of slot 60 by wing nut 73 on rod 70. In order to change ring member 24, member 62 is first moved to the right in the sense of FIG. 8 by turning or simply moving wing nut 73. With member 62 clear of slot 60, ring member 24' is then easily removed from the device as described above and replaced with a different ring member, such as ring member 24'' provided with a smaller seed cell 64. In that event, member 62 is moved further to the left to position the member adjacent the bottom of slot 60' in ring member 24''. It will be clear from the foregoing that member 62 is an easy fit in slot 60 and effectively closes the seed cell aperture as in the case of member 51. With this construction it is only necessary to replace member 33' after excessive wear.

Since the speed of rotation of ring member 24 may be variable relative to the ground speed of the seed planter, it is not necessary to change the number of seed cells per ring, and it is thus not necessary to change the spacing or arms 50 on seed ejector 40. However, where it is desired to change the peripheral spacing of seed cells in ring 24, it is a simple matter to replace member 40 since this is accessible by simply removing nut 22 and plate 19 from drive shaft 21.

What is claimed is:

1. Apparatus for planting seeds in a row comprising: supporting frame means; a drive shaft rotatably mounted on said frame and having its longitudinal axis positioned transverse to a row of seeds being planted; a first circular member releasably secured to said drive shaft for rotation therewith and comprising an inner member releasably secured to said drive shaft and a first outer annular ring member releasably secured to said inner member, said annular ring member having a cylindrical outer surface concentric with said drive shaft and a cylindrical inner surface concentric with said drive shaft; a second circular member fixed with respect to said frame and comprising a second annular ring member having a cylindrical outer surface concentric with said drive shaft and closely adjacent to the cylindrical inner surface of said first annular ring member, said second annular ring member being provided with an opening in said cylindrical surface at the lower portion thereof; said first annular ring member being removable from said device without requiring removal of said second circular member from said device; said first annular ring member being provided with a plurality of seed-holding apertures spaced around the periphery thereof, the opening of said apertures and the thickness of said first annular ring member conforming substantially to the size of the individual seeds to be planted; seed hopper means including an opening adjacent an upper portion of the circular path of travel defined by the outer cylindrical surface of said first circular ring member for introducing seeds from said hopper means into said apertures; seed ejecting means located at a lower portion of the circular path of travel defined by the outer cylindrical surface of said first circular ring member and comprising a member movable through said opening at the lower portion of said second annular ring member for ejecting seeds radially outwards from said apertures to plant a row of said seeds; and aperture closure means comprising a curved member positioned concentrically with respect to said cylindrical outer surface of said first ring member and located between said seed hopper means and said seed ejecting means for preventing dislodgement of seeds from said apertures.

2. A seed planter according to claim 1 wherein said inner portion of said first circular member comprises a first circular plate member concentrically secured to said drive shaft for rotation therewith and wherein said first annular ring member is releasably secured to a side of said first circular plate member.

3. A seed planter according to claim 1 wherein said second circular member comprises a second circular plate member concentric with said drive shaft secured to said housing and wherein said second annular ring member is releasably secured to a side of said second circular plate member, said side facing said first circular member.

4. A seed planter according to claim 1 further including means for adjusting the speed of rotation of said drive shaft independently of the linear speed of said device relative to the ground.

5. A seed planter according to claim 1 wherein said ejecting means comprises a rotatable member rotatably mounted on said second circular member and having a plurality of radially extending arms, the ends of said arms being insertable into said apertures to rotate said rotatable member to bring successive arms into engagement with successive apertures for ejecting seeds therefrom.

6. A seed planter according to claim 5 wherein said rotatable member is adjustably moveable radially with respect to said drive shaft for removal of said first annular ring member.

7. A seed planter according to claim 6 further including means for biasing said rotatable member radially outward for insertion of said arms in said apertures.

8. A seed planter according to claim 1 further including a peripheral chamber adjacent the outer openings of said seed holding apertures, said chamber being wider than the width of said seed holding apertures, and wherein said aperture closure means comprises a member positionable in said peripheral chamber.

9. Apparatus for planting seeds in a row comprising: supporting frame means; a drive shaft rotatably mounted on said frame and having its longitudinal axis positioned transverse to a row of seeds being planted; a first circular member releasably secured to said drive shaft for rotation therewith and comprising a first annular ring member having a cylindrical outer surface concentric with said drive shaft and a cylindrical inner surface concentric with said drive shaft; a second circular member fixed with respect to said frame and comprising a second annular ring member having a cylindrical outer surface concentric with said drive shaft and closely adjacent to the cylindrical inner surface of said first annular ring member, said second annular ring member being provided with an opening in said cylindrical surface at the lower portion thereof; said first annular ring member being provided with a plurality of seed-holding apertures spaced around the periphery thereof, the opening of said apertures and the thickness of said first annular ring member conforming substantially to the size of the individual seeds to be planted; seed hopper means including an opening adjacent an upper portion of the circular path of travel defined by the outer cylindrical surface of said first circular ring member for introducing seeds from said hopper means into said apertures; seed ejecting means located at a lower portion of the circular path of travel defined by the outer cylindrical surface of said first circular ring member and comprising a member movable through said opening at the lower portion of said second annular ring member for ejecting seeds radially outwards from said apertures to plant a row of said seeds; and aperture closure means comprising a curved member positioned concentrically with respect to said cylindrical outer surface of said first ring member and located between said seed hopper means and said seed ejecting means for preventing dislodgement of seeds from said apertures, said first annular ring comprising a peripheral slot in said cylindrical outer surface, said slot being wider than the width of said seed-holding apertures, and said aperture closure means comprising a member positionable in said peripheral slot.

* * * * *